(12) United States Patent
Chen et al.

(10) Patent No.: US 12,199,518 B2
(45) Date of Patent: Jan. 14, 2025

(54) FLYBACK CONVERTER WITH IMPROVED OVER-VOLTAGE PROTECTION FUNCTIONALITY

(71) Applicant: Nanjing Greenchip Semiconductor Co., Ltd., Nanjing (CN)

(72) Inventors: Szu-Han Chen, Nanjing (CN); Wen-An Tsou, Nanjing (CN)

(73) Assignee: Nanjing Greenchip Semiconductor Co., Ltd., Nanjing (CN)

( * ) Notice: Subject to any disclaimer, the term of this patent is extended or adjusted under 35 U.S.C. 154(b) by 289 days.

(21) Appl. No.: 17/719,384

(22) Filed: Apr. 13, 2022

(65) Prior Publication Data

US 2022/0399820 A1 Dec. 15, 2022

(30) Foreign Application Priority Data

Jun. 11, 2021 (CN) .......................... 202110650470.2

(51) Int. Cl.
  *H02M 3/335* (2006.01)
  *H02M 1/00* (2006.01)
  *H02M 1/32* (2007.01)

(52) U.S. Cl.
  CPC ..... *H02M 3/33569* (2013.01); *H02M 1/0009* (2021.05); *H02M 1/32* (2013.01)

(58) Field of Classification Search
  CPC ... H02M 1/0009; H02M 1/32; H02M 3/33569
  See application file for complete search history.

(56) References Cited

U.S. PATENT DOCUMENTS

| 10,250,151 B1 * | 4/2019 | Wu ..................... H02M 3/33592 |
| 2014/0198540 A1 * | 7/2014 | Xu ..................... H02M 3/33523 |
| | | 363/21.12 |

* cited by examiner

*Primary Examiner* — Jue Zhang
*Assistant Examiner* — Lakaisha Jackson
(74) *Attorney, Agent, or Firm* — Chih Feng Yeh; Yongjean Cousulting Inc.

(57) ABSTRACT

A flyback converter with improved over-voltage protection (OVP) functionality, which includes a primary winding arranged to receive an input voltage, a secondary winding coupled to the primary winding and connected to a rectifier circuit to generate DC output voltage, a primary side regulating controller, an auxiliary winding arranged to provide electric power to the primary side regulating controller, an external detection circuit connected between the auxiliary winding and the primary side regulating controller, an internal detection circuit arranged inside the primary side regulating controller and coupled to the external detection circuit by detecting the current value flowing through the external detection circuit and comparing it with a predetermined current value of the internal detection circuit to enable or disable an OVP circuit to protect the primary side regulating controller, and a switching device arranged to receive on/off signals generated for regulating current flowing through the primary winding.

19 Claims, 4 Drawing Sheets

FLYBACK CONVERTER WITH IMPROVED OVER-VOLTAGE PROTECTION FUNCTIONALITY

CROSS-REFERENCE STATEMENT

The present application is based on, and claims priority from, China Patent Application Serial Number 202110650470.2, filed Jun. 11, 2021, the disclosure of which is hereby incorporated by reference herein in its entirety.

TECHNICAL FIELD

The present invention relates to a flyback converter, and more particularly, relates to a flyback converter with improved over-voltage protection (OVP) functionality.

RELATED ART

Flyback converters are widely used in power conversion devices of various electronic products for having the advantages of high efficiency, low loss, small size and light weight. The protection mechanism of the flyback converter, such as the over-voltage protection function, is a very important part for regularly and stably operating the flyback converter.

Conventionally, flyback converters utilize the detection of the primary side input voltage as an over-voltage protection (OVP) mechanism, and the voltage protection point is fixed. Circuitry performing over-voltage protection (OVP) in a flyback converter must maintain a constant detection mode, which is constantly consume power all the time.

In recent years, much attention has been paid on the energy consumption of electronic equipments, for example, more and more strict energy-saving standards have been promulgated accordingly. Charging devices are used in personal computers and other electronic equipments, such as chargers for smart phones, tablet computers and other similar electronic computing devices, which usually utilize a flyback converter to make AC to DC conversion for charging. In order to meet the more stringent green energy and environmental protection requirements of electronic devices in the future, a flyback converter having OVP mechanism with much refined energy-saving specifications is therefore required.

SUMMARY

For the aforementioned purpose, in one aspect of the present invention, a flyback converter with improved over-voltage protection (OVP) functionality is proposed, which includes a primary winding arranged to receive an input voltage; a secondary winding coupled to the primary winding and connected to a rectifier circuit to generate an output DC voltage; a primary side regulating controller; an auxiliary winding coupled to the primary winding and arranged to provide electric power to the primary side regulating controller; an external detection circuit connected between the auxiliary winding and the primary side regulating controller; an internal detection circuit arranged inside the primary side regulating controller and coupled to the external detection circuit to enable or disable an over-voltage protection circuit to protect the primary side regulating controller, by detecting a current value flowing through the external detection circuit and comparing the current value with a predetermined current value of the internal detection circuit; and a switching device connected to the primary winding and the primary side regulating controller to receive on/off signals generated from the primary side regulating controller to regulate current flowing through the primary winding.

In one preferred embodiment, the external detection circuit is coupled to said internal detection circuit through a connection terminal.

In one preferred embodiment, the internal detection circuit includes: an operational amplifier configured to have a positive input terminal grounded, a negative input terminal coupled to a first transistor and the connection terminal, and an output terminal coupled to the first transistor; a current mirror configured to have an input terminal coupled to the first transistor to receive the current value flowing through the external detection circuit and output a current with a value proportion to the current value; a current source coupled to the current mirror to provide the predetermined current value; a buffer configured to have an input terminal coupled to the output terminal of the current mirror and the current source, output terminal of the buffer coupled to the over-voltage protection circuit, by comparing the current value flowing through the external detection circuit with the preset current value to activate or deactivate the over-voltage protection circuit.

In one preferred embodiment, the first transistor is a N-type metal oxide semiconductor field effect transistor.

In one preferred embodiment, the current mirror includes: a second transistor, the second transistor being a P-type metal oxide semiconductor field effect transistor; a third transistor, the third transistor being a P-type metal oxide semiconductor field effect transistor, wherein gates of the second transistor and the third transistor are connected to each other and also coupled to drains of the first transistor and the second transistor, and sources of the second transistor and the third transistor are both connected to a power supply source.

In one preferred embodiment, the negative input terminal of the operational amplifier is coupled to source of the first transistor.

In one preferred embodiment, the output terminal of the operational amplifier is coupled to gate of the first transistor.

In one preferred embodiment, the input end of the current mirror is coupled to the drain of the first transistor.

In one preferred embodiment, the external detection circuit is a voltage divider circuit.

In one preferred embodiment, the primary side regulating controller is an integrated circuit controller.

In one preferred embodiment, the switching device is a metal oxide semiconductor field effect transistor.

In another aspect of the present invention, a flyback converter with improved over-voltage protection (OVP) functionality is proposed, which includes a primary winding arranged to receive an input voltage; a secondary winding coupled to the primary winding and connected to a rectifier circuit to generate an output DC voltage; a primary side regulating controller; an auxiliary winding coupled to the primary winding and arranged to provide electric power to the primary side regulating controller; an external detection circuit connected between the auxiliary winding and the primary side regulating controller; an internal detection circuit arranged inside the primary side regulating controller and coupled to the external detection circuit through a connection terminal, by detecting a current value flowing through the external detection circuit and comparing the current value with a predetermined current value of the internal detection circuit, wherein the internal detection circuit includes: a feedback circuit is configured to lock voltage of the connection terminal to a preset voltage value;

a current mirror coupled to the feedback circuit with an input terminal to receive the current value flowing through the external detection circuit and output a current with a value proportion to the current value; a comparison circuit is configured to have an input terminal coupled to the output terminal of the current mirror and coupled to a current source with a predetermined current value, an output terminal coupled to the over-voltage protection circuit, by comparing the current value flowing through the external detection circuit with the preset current value to activate or deactivate the over-voltage protection circuit; and a switching device connected to the primary winding and the primary side regulating controller to receive on/off signals generated from the primary side regulating controller to regulate current flowing through the primary winding.

In one preferred embodiment, the feedback circuit includes an operational amplifier configured to have a positive input terminal grounded, a negative input terminal coupled to the current mirror via a first transistor and the connection terminal, and an output terminal coupled to the first transistor.

In one preferred embodiment, the preset voltage value is zero volt.

In one preferred embodiment, the comparison circuit is a buffer configured to output a digital signal of 0 or 1, according to the comparison between the current value flowing through the external detection circuit and the predetermined current value, to activate or deactivate the over-voltage protection circuit.

In one preferred embodiment, the first transistor is a N-type metal oxide semiconductor field effect transistor.

In one preferred embodiment, the current mirror includes: a second transistor, the second transistor being a P-type metal oxide semiconductor field effect transistor; a third transistor, the third transistor being a P-type metal oxide semiconductor field effect transistor, wherein gates of the second transistor and the third transistor are connected to each other and also coupled to drains of the first transistor and the second transistor, and sources of the second transistor and the third transistor are both connected to a power supply source.

In one preferred embodiment, the negative input terminal of the operational amplifier is coupled to source of the first transistor.

In one preferred embodiment, the output terminal of the operational amplifier is coupled to gate of the first transistor.

In one preferred embodiment, the input end of the current mirror is coupled to the drain of the first transistor.

In one preferred embodiment, the external detection circuit is a voltage divider circuit.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention aims to propose a flyback converter with improved over voltage protection, which improves the problem that the voltage protection point is fixed in conventional flyback converters.

Figure 1:
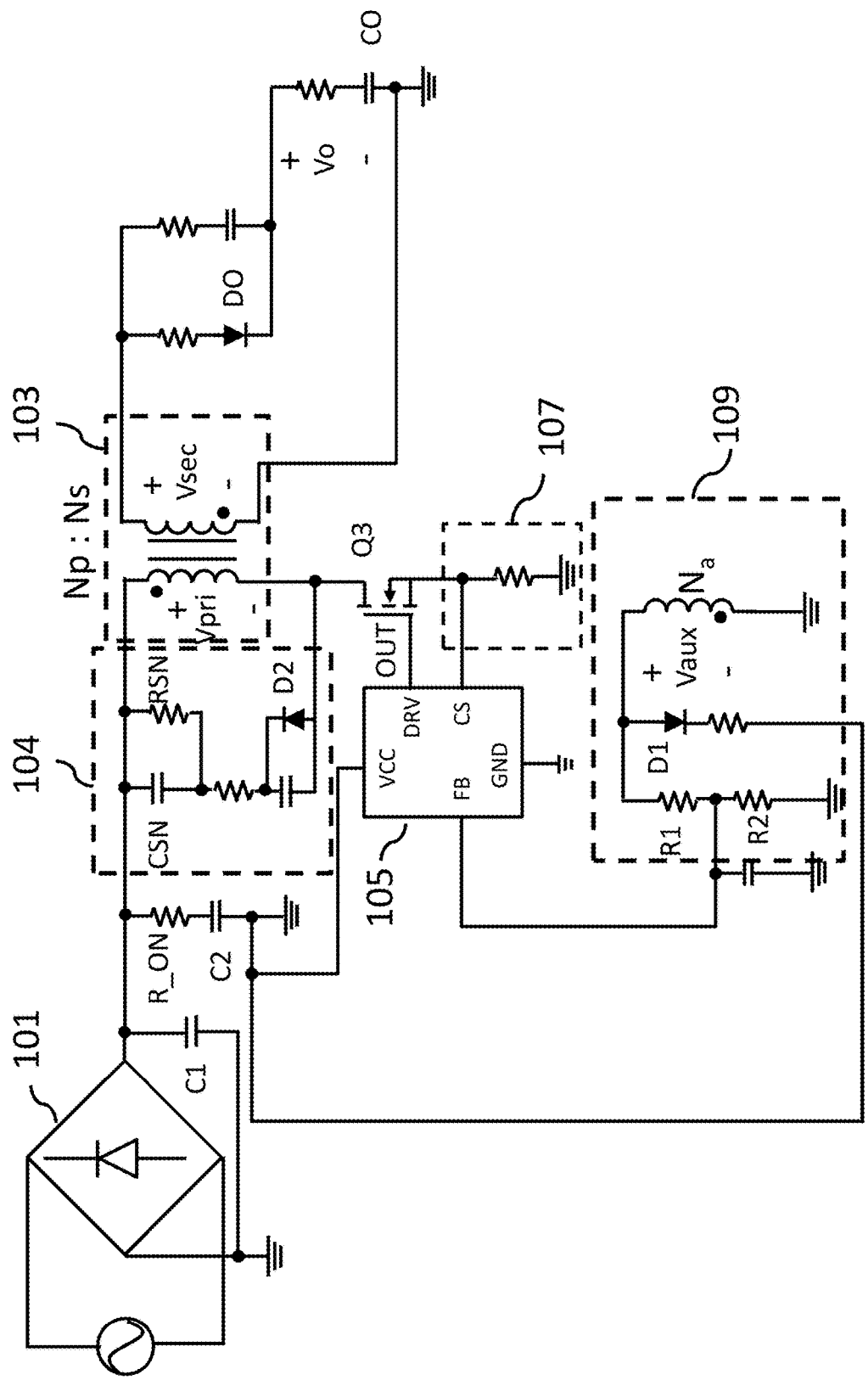
FIG. 1 illustrates an application circuitry showing a flyback converter with improved over-voltage protection (OVP) functionality according to a preferred embodiment of the present invention.

Please refer to FIG. 1, an application circuitry of a flyback converter with improved over-voltage protection (OVP) functionality proposed according to a preferred embodiment of the present invention, the input voltage Vin came from the utility power supply, after being filtered by the bridge rectifier 101 and the input capacitor C1, is rectified into a DC voltage and then output to input of the transformer 103. The application circuitry includes a primary side regulating (PSR) controller 105, a primary side main switch Q3, a transformer 103, an auxiliary power rectifier diode D1, an auxiliary power rectifier filter capacitor C2, a start-up resistor R_ON, two demagnetization (or quasi-resonant) detection voltage divider resistors R1 and R2, a RCD clamping component 104 including a RSN resistor, a CSN capacitor and a diode D2, a rectifier diode DO, and an output filter capacitor CO. The PSR controller 105 is first charged to the auxiliary power rectifier filter capacitor C2 through the starting resistor R_ON, when the voltage been charged reaches the starting gate voltage of the PSR controller 105, its output terminal DRV starts to output a turn-on signal to control the primary side main switch Q3 to turn on. When Q3 on the primary side is turned on, its on-state is subject to the built-in current limit and the slow start control voltage levels of the PSR controller 105, Q3 will be turned off until the turn-on signal of the next cycle is received and the ON/OFF action is repeated. AC voltage of the output winding (secondary winding) Ns of the transformer 103 gradually increases due to the conduction of Q3 (Q3 is ON) on the secondary side, then the AC voltage is filtered by the output diode DO and the output filter capacitor CO to generate an output DC voltage Vo. AC voltage of the auxiliary winding Na coupled to the primary side transformer gradually increases, and the AC voltage is filtered to generate a DC output through the auxiliary power rectifier diode D1 and filter capacitor C2, which provides the power required by the PSR controller 105 and replaces the power supply functionality of the starting resistor R_ON.

In a preferred embodiment, the PSR controller 105 is an integrated circuit controller (controller IC).

In a preferred embodiment, the main switch Q3 (switching device) is a metal oxide semiconductor field effect transistor (MOSFET).

When the flyback converter energizes the transformer 103 during turn-on (t_on) period, the input voltage Vin of the flyback converter can be detected by the primary to auxiliary winding turns ratio Np/Na of the transformer 103 and the voltage Vaux measured on the auxiliary winding Na.

Auxiliary winding Na combined with voltage divider resistors R1 and R2 (voltage divider circuit) is connected to the FB pin as an external detection circuit 109 for quasi-resonant (QR) mode and OVP detections.

The current detection circuit 107 is electrically connected to the drain of the MOSFET transistor (main switch Q3) and the CS pin of the PSR controller 105 for detecting the current signal of the MOSFET transistor.

Figure 2:
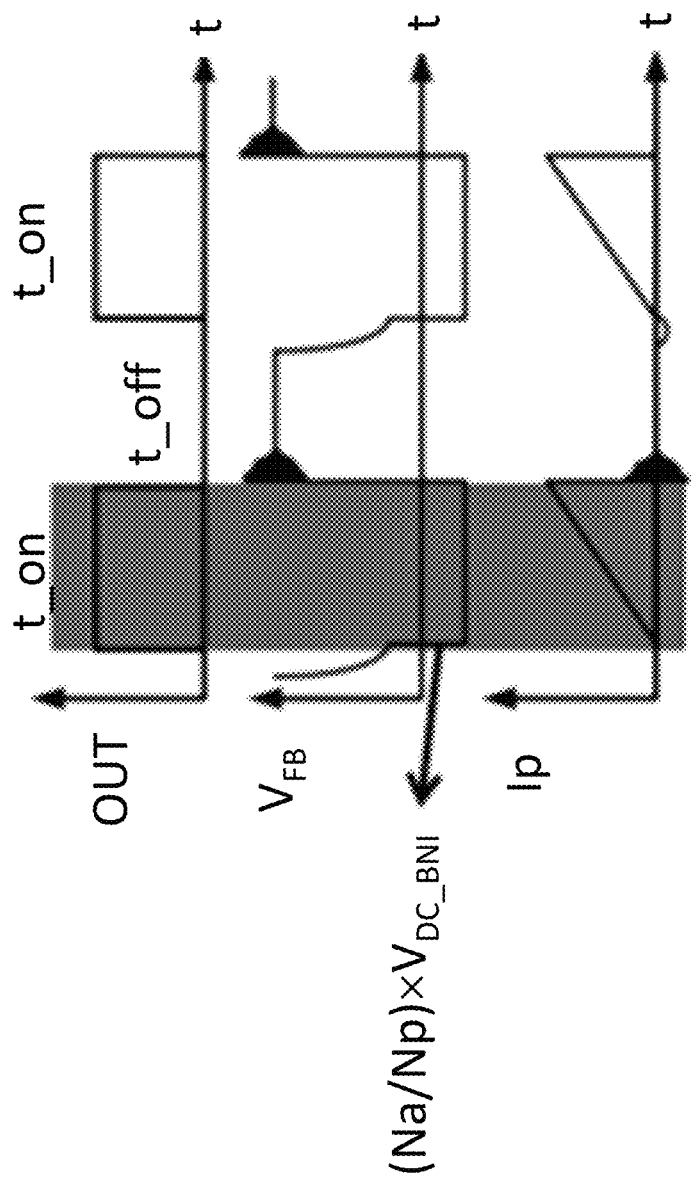
FIG. 2 illustrates the charge and discharge waveforms detected by the connection terminals DRV(OUT), FB, and CS of the PSR controller in the flyback converter according to a preferred embodiment of the present invention.

Referring to FIG. 2, it shows the charging and discharging waveforms in sequence (from top to bottom) detected by DRV(OUT), FB, and CS pins of the PSR controller 105 in the flyback converter. FIG. 2 shows that when the flyback converter is in t_on period, the voltage detected by the FB pin is $-(Na/Np) \times V_{DC\_BNI}$ (because the auxiliary winding Na is out of phase with the primary winding Np), which is a fixed negative value.

Referring to FIG. 1 and FIG. 2, if a feedback circuit is used to lock the voltage value $V_{FB}$ of the FB pin to zero volt (will be discussed in FIG. 4) when designing the detection circuit for OVP of the flyback converter, which can result the following outcomes. During the t_on period of the flyback converter, the external detection circuit 109 for OVP will generate a current $I_{FB}$ flowing through the FB pin, one of the voltage divider resistor R1 and the auxiliary winding Na, and the value of $I_{FB}$ is $(1/R1) \times (Na/Np) \times Vpri$; when the flyback converter is in the t_off, i.e. in turn-off, period, the external detection circuit 109 for OVP does not generate current.

Figure 3:
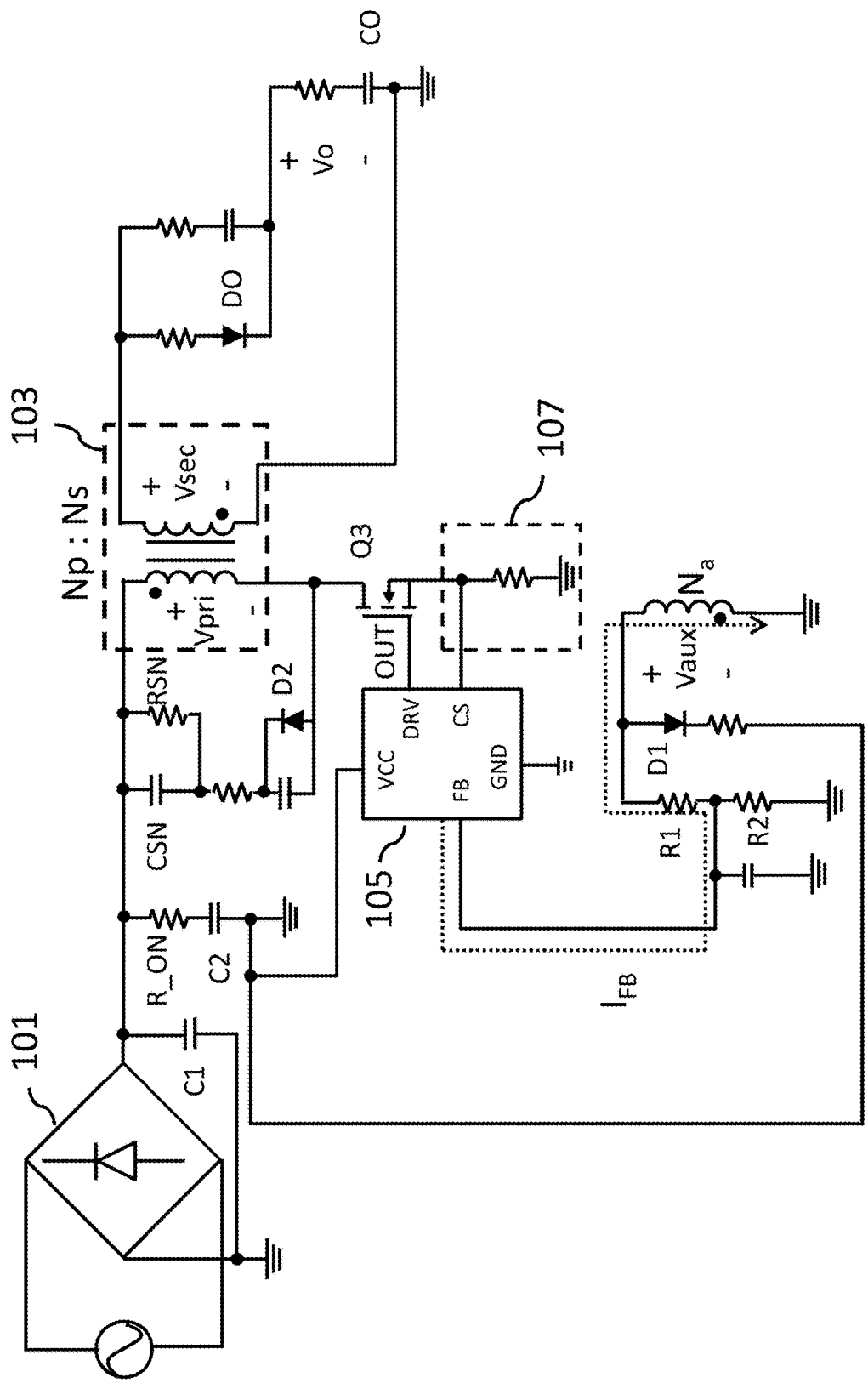
FIG. 3 illustrates the external detection circuit for OVP generates a current path flow through, during the turn-on (t_on) period of the flyback converter, according to a preferred embodiment of the present invention.

Referring to FIG. 3, it shows the detection circuit for OVP of the flyback converter, during the t_on period of the flyback converter, the external detection circuit 109 will generate a current $I_{FB}$ flowing through the FB pin, the voltage divider resistor R1 and the auxiliary winding Na, where the current $I_{FB}$ is represented by a dashed arrow.

Figure 4:
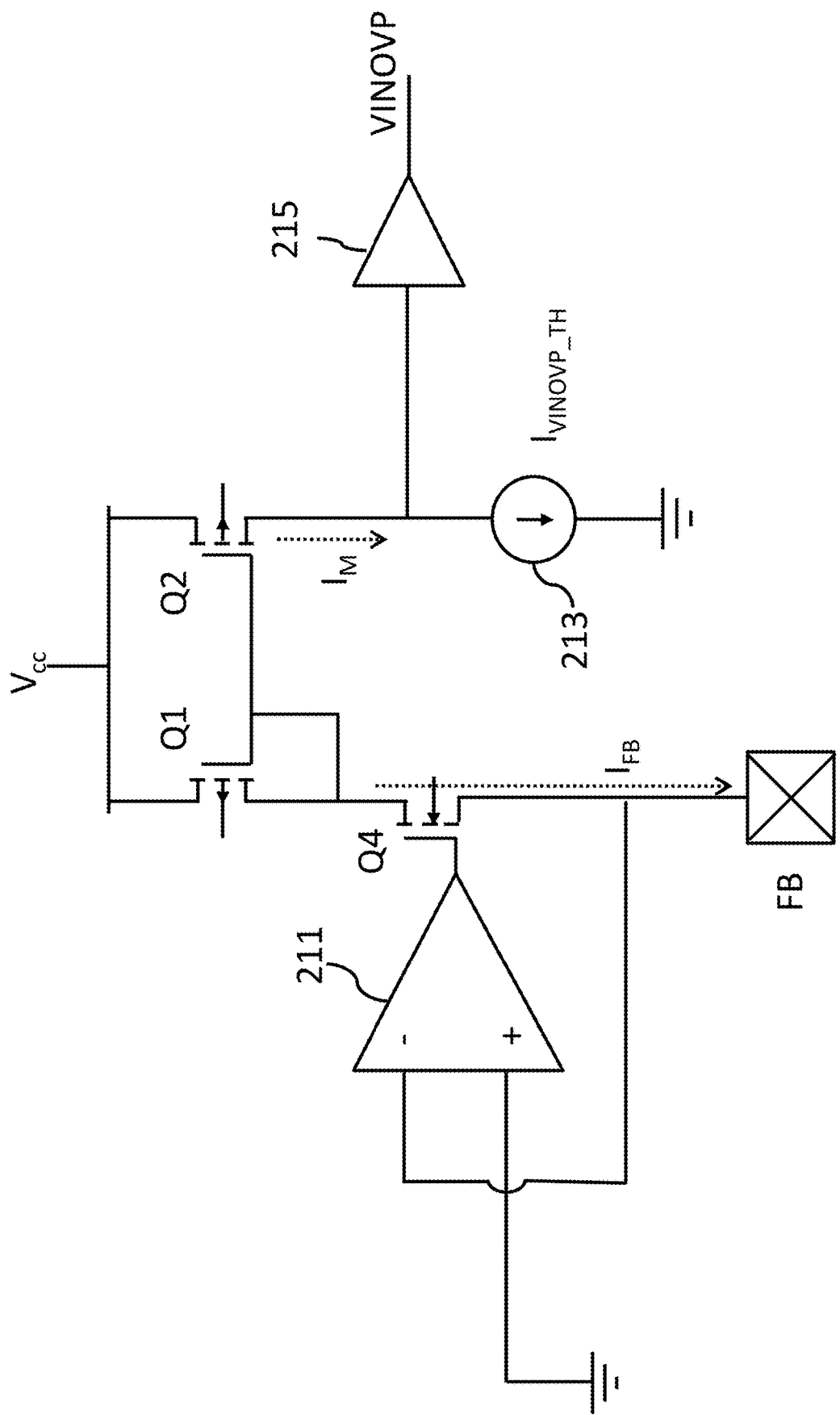
FIG. 4 illustrates a circuit diagram in which the internal portion of the detection circuit for OVP, which is located inside the PSR controller, according to a preferred embodiment of the present invention.

Please refer to FIG. 4, which is a circuit diagram of the detection circuit for OVP inside the PSR controller 105 according to the present invention, as shown in FIG. 4, the circuit includes an operational amplifier (OPA) 211, a transistor Q4 (a first transistor), and a current mirror consisting of a plurality of transistors Q1 (a second transistor) and Q2 (a third transistor). The positive input terminal (+) of the OPA 211 is grounded. The negative input terminal (−) of the OPA 211 is coupled to the source of the transistor Q4 and the FB pin of the PSR controller 105, where the FB pin is coupled to the external detection circuit 109 (FIG. 1). Therefore, the voltage value at the FB pin has been locked to zero volt. The gate of the transistor Q4 is coupled to the output terminal of the OPA 211. The current $I_{FB}$ is generated from the drain of the transistor Q4, and the level (value) of the current $I_{FB}$ is $$\frac{(Na/Np) \times Vpri}{R1},$$

where Na/Np is the ratio of the auxiliary winding to the primary winding, Vpri is the voltage of the primary winding, and R1 is one of the voltage divider resistors (refer to FIG. 1, FIG. 3).

The drain of the transistor Q1 is coupled to the drain of the transistor Q4 to receive the current $I_{FB}$. The gates of the transistors Q1 and Q2 are coupled to each other and to the drains of the transistors Q1 and Q4, and the sources of the transistors Q1 and Q2 are coupled to the supply voltage $V_{cc}$.

In a preferred embodiment, the first transistor is a N-type metal oxide semiconductor field effect transistor (NMOSFET).

In a preferred embodiment, the second transistor is a P-type metal oxide semiconductor field effect transistor (PMOSFET).

In a preferred embodiment, the third transistor is a P-type metal oxide semiconductor field effect transistor (PMOSFET).

The current $I_M$ is generated at the drain of the transistor Q2 according to the current $I_{FB}$, which means that the current mirror receives the current $I_{FB}$ and mirrors the current $I_{FB}$ to generate the current $I_M$. Therefore, $I_M$ depends on the relevant parameters of the transistors Q1 and Q2, and there is a proportional relationship between $I_M$ and $I_{FB}$. If the transistors Q1 and Q2 are identical, $I_M$ is equal to $I_{FB}$.

A current source 213 generate a current has a predetermined current value IVINOVP_TH, one end is coupled to the drain of the transistor Q2 and the other end is grounded.

A buffer 215 has an input terminal coupled to the current source 213 and the drain of the transistor Q2, and an output terminal coupled to the input terminal of the OVP circuit of the flyback converter for enabling or disabling the OVP circuit. The buffer 215 can output a digital signal 0 or 1 according to the comparison between $I_M$ generated by the current mirror and a preset current value IVINOVP_TH. When the input voltage Vin undergoes large transient changes, the output voltage Vpri exceeds the rated value, which will be reflected on $I_{FB}$ and $I_M$, the level of current $I_{FB}$ is $$\frac{(Na/Np) \times Vpri}{R1}.$$

Therefore, when the current $I_M$ is greater than the preset current value IVINOVP_TH, the buffer 215 outputs digital signal 1, OVP circuit of the flyback converter is then triggered to protect the PSR controller 105, otherwise the buffer 215 outputs digital signal 0, OVP circuit of the flyback converter will be in sleep state.

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. A flyback converter with improved over-voltage protection (OVP) functionality comprising:
    a primary winding arranged to receive an input voltage;
    a secondary winding coupled to said primary winding and connected to a rectifier circuit to generate an output DC voltage;
    a primary side regulating controller;
    an auxiliary winding coupled to said primary winding and arranged to provide electric power to said primary side regulating controller;
    an external detection circuit connected between said auxiliary winding and said primary side regulating controller;
    an internal detection circuit arranged inside said primary side regulating controller and coupled to said external detection circuit to enable or disable an over-voltage protection circuit to protect said primary side regulating controller, by detecting a current value flowing through said external detection circuit and comparing said current value with a predetermined current value of said internal detection circuit; and a switching device connected to said primary winding and said primary side regulating controller to receive on/off signals generated from said primary side regulating controller to regulate current flowing through said primary winding-;

wherein said external detection circuit is coupled to said internal detection circuit through a connection terminal;

wherein said internal detection circuit includes:

an operational amplifier configured to have a positive input terminal grounded, a negative input terminal coupled to a first transistor and said connection terminal, and an output terminal coupled to said first transistor;

a current mirror configured to have an input terminal coupled to said first transistor to receive said current value flowing through said external detection circuit and output a current with a value proportion to said current value;

a current source coupled to said current mirror to provide said predetermined current value;

a buffer configured to have an input terminal coupled to said output terminal of said current mirror and said current source, output terminal of said buffer coupled to said over-voltage protection circuit, by comparing said current value flowing through said external detection circuit with said preset current value to activate or deactivate said over-voltage protection circuit.

2. The flyback converter of claim 1, wherein said first transistor is a N-type metal oxide semiconductor field effect transistor.

3. The flyback converter of claim 2, wherein said current mirror includes:

a second transistor, said second transistor being a P-type metal oxide semiconductor field effect transistor;

a third transistor, said third transistor being a P-type metal oxide semiconductor field effect transistor, wherein gates of said second transistor and said third transistor are connected to each other and also coupled to drains of said first transistor and said second transistor, and sources of said second transistor and said third transistor are both connected to a power supply source.

4. The flyback converter of claim 2, wherein said negative input terminal of said operational amplifier is coupled to source of said first transistor.

5. The flyback converter of claim 2, wherein said output terminal of said operational amplifier is coupled to gate of said first transistor.

6. The flyback converter of claim 2, wherein said input end of said current mirror is coupled to said drain of said first transistor.

7. The flyback converter of claim 1, wherein said primary side regulating controller is an integrated circuit controller.

8. The flyback converter of claim 1, wherein said switching device is a metal oxide semiconductor field effect transistor.

9. The flyback converter of claim 1, wherein said external detection circuit is a voltage divider circuit.

10. A flyback converter with improved over-voltage protection (OVP) functionality, comprising:

a primary winding configured to receive an input voltage;

a secondary winding coupled to said primary winding and connected to a rectifier circuit to generate an output DC voltage;

a primary side regulating controller;

an auxiliary winding coupled to said primary winding and arranged to provide electric power to said primary side regulating controller;

an external detection circuit connected between said auxiliary winding and said primary side regulating controller;

an internal detection circuit arranged inside said primary side regulating controller and coupled to said external detection circuit through a connection terminal, by detecting a current value flowing through said external detection circuit and comparing said current value with a predetermined current value of said internal detection circuit, wherein said internal detection circuit includes:

a feedback circuit is configured to lock voltage of said connection terminal to a preset voltage value;

a current mirror coupled to said feedback circuit with an input terminal to receive said current value flowing through said external detection circuit and output a current with a value proportion to said current value;

a comparison circuit is configured to have an input terminal coupled to said output terminal of said current mirror and coupled to a current source with a predetermined current value, an output terminal coupled to said over-voltage protection circuit, by comparing said current value flowing through said external detection circuit with said preset current value to activate or deactivate said over-voltage protection circuit; and a switching device connected to said primary winding and said primary side regulating controller to receive on/off signals generated from said primary side regulating controller to regulate current flowing through said primary winding.

11. The flyback converter of claim 10, wherein said comparison circuit is a buffer configured to output a digital signal of 0 or 1, according to the comparison between said current value flowing through said external detection circuit and said predetermined current value, to activate or deactivate said over-voltage protection circuit.

12. The flyback converter of claim 10, wherein said external detection circuit is a voltage divider circuit.

13. The flyback converter of claim 10, wherein said feedback circuit includes an operational amplifier configured to have a positive input terminal grounded, a negative input terminal coupled to said current mirror via a first transistor and said connection terminal, and an output terminal coupled to said first transistor.

14. The flyback converter of claim 13, wherein said preset voltage value is zero volt.

15. The flyback converter of claim 13, wherein said current mirror includes:

a second transistor, said second transistor being a P-type metal oxide semiconductor field effect transistor;

a third transistor, said third transistor being a P-type metal oxide semiconductor field effect transistor, wherein gates of said second transistor and said third transistor are connected to each other and also coupled to drains of said first transistor and said second transistor, and sources of said second transistor and said third transistor are both connected to a power supply source.

16. The flyback converter of claim 13, wherein said first transistor is a N-type metal oxide semiconductor field effect transistor.

17. The flyback converter of claim 16, wherein said input end of said current mirror is coupled to said drain of said first transistor.

18. The flyback converter of claim 16, wherein said negative input terminal of said operational amplifier is coupled to source of said first transistor.

19. The flyback converter of claim 16, wherein said output terminal of said operational amplifier is coupled to gate of said first transistor.

* * * * *